United States Patent [19]
Broberg et al.
[11] Patent Number: 4,896,016
[45] Date of Patent: Jan. 23, 1990

[54] PLASMA ARC METAL CUTTING APPARATUS WITH ACTUATION SPRING

[75] Inventors: Daniel M. Broberg, Edina; Terry A. Prentice, Bloomington, both of Minn.
[73] Assignee: Century Mfg. Co., Minneapolis, Minn.

[21] Appl. No.: 341,838
[22] Filed: Apr. 24, 1989
[51] Int. Cl.[4] ........ B23K 9/06
[52] U.S. Cl. ........ 219/121.5; 219/121.57; 219/121.39; 219/121.48; 219/124.01
[58] Field of Search ........ 219/121.39, 121.37, 219/121.44, 121.54, 121.57, 75, 124.01, 121.48

[56] References Cited

U.S. PATENT DOCUMENTS 2,561,405 7/1951 O'Brien et al. ........ 267/1
3,264,884 9/1966 Brooke ........ 74/17.8
3,366,772 1/1968 Wickham et al. ........ 219/75
3,803,380 4/1974 Ragalle ........ 219/121.57
3,813,510 5/1974 Hatch ........ 219/121.52
3,814,557 3/1985 Dallavalle et al. ........ 219/121.54
4,590,354 5/1986 Mashic et al. ........ 219/121.48
4,791,268 12/1988 Sanders et al. ........ 219/121.57

*Primary Examiner*—M. H. Paschall
*Attorney, Agent, or Firm*—Leo Gregory

[57] ABSTRACT

In connection with a plasma arc metal cutting apparatus, an electrode having vertical movement within a nozzle, said nozzle having a gas supply passing therethrough, an over-center spring mechanism holding the electrode in one operating position, a switch in one position energizing the electrode in engagement with the nozzle and said switch in a second position actuating the spring mechanism to snap the electrode to a position away from engagement with the nozzle and thus draw an arc between the electrode and the nozzle, the arc comprising a plasma flame to cut materials.

8 Claims, 4 Drawing Sheets

PLASMA ARC METAL CUTTING APPARATUS WITH ACTUATION SPRING

BACKGROUND OF INVENTION

1. Field of Invention

This invention relates to a plasma arc cutting apparatus comprising an over-center spring mechanism which very rapidly and precisely separates a cathode from an anode, moving the cathode from one operating position to a second operating position for contact arc starting.

2. Description of The Prior Art

It is known in the art generally to use a snap mechanism to move a member into or out of an operating position.

In Armstrong U.S. Pat. No. 3,367,463 an arcuate clutch shoe and a restraining pin are mounted at a drive plate intermediate a leaf spring and a brake shoe. The leaf spring co-acts with the pin to maintain the shoe to be engaged or disengaged.

O'Brien et al. in U.S. Pat. No. 2,561,405 shows a snap disc spring with a throw rod using a compression coil spring to increase the effective length of throw of the snap disc spring in moving the rod.

Rasmussen et al. in U.S. Pat. No. 2,410,680 shows a snap action mechanism with a quick snap action from an inactive to an active position embodying the use of a diaphragm.

In Sanders U.S. Pat. No. 4,791,268, a movable cathode is disclosed in a plasma torch, said cathode being automatically separated from an anode or nozzle contact by a build-up of a gas pressure opposing and overcoming a normal spring pressure whereby the torch is useable in a non-transferred mode as well as in a transferred mode.

The above are indicative of the present state of the art.

SUMMARY OF THE INVENTION

It is an object of this invention to provide in a plasma torch structure means to start a contact arc in which the cathode and anode have relative movement for separation whereby the act of separation creates a pilot arc across the gap formed by this separation.

It is another object herein to provide a structure embodying a movable cathode and a stationary anode or the reverse structure in which both the cathode and anode are capable of movement.

It is a further object herein to provide a plasma torch structure embodying an over-center spring mechanism to separate the cathode and anode by a switch lever action, the switch being in circuit with said cathode or anode or by a remote operating means such as energizing a solenoid to actuate the spring mechanism.

It is also an object of this invention to provide a plasma torch structure wherein the electrode and nozzle are normally in engagement and in circuit. An over-center spring mechanism is in engagement with the electrode. The over-center spring mechanism is actuated upon the circuit becoming energized whereby the electrode is withdrawn from the nozzle and the pilot arc created by the circuit becoming energized initiates a plasma jet in a non-transferrable mode, the jet projecting from the nozzle through an orifice therein is brought into contact with a work piece and the plasma arc is transferred from the nozzle to the work piece and in this transferred mode current flows through the plasma arc back to ground through the work piece.

Finally it is also an object herein that when current is shut off from the torch, the over-center spring mechanism snaps back to its normal position of pressing the electrode against the nozzle for engagement therewith and the resulting impact between the electrode and nozzle provides a cleaning action by breaking up the non-conductive oxides which may have developed and gathered on the surfaces of either the electrode or the nozzle.

These and other objects and advantages of the invention will be set forth in the following description made in connection with the accompanying drawings in which like reference characters refer to similar parts throughout the several views.

DESCRIPTION OF A PREFERRED EMBODIMENT

Figure 1:
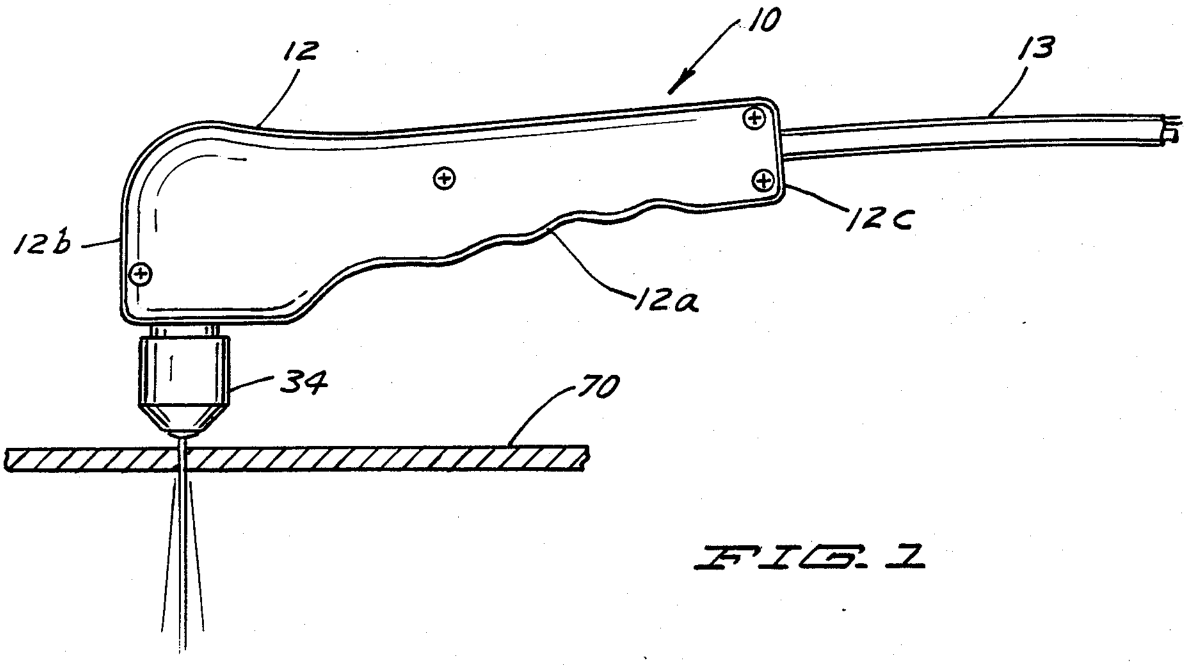
FIG. 1 is a side elevational view of the invention in operating position in connection with a work piece shown in vertical section.
Figure 2:
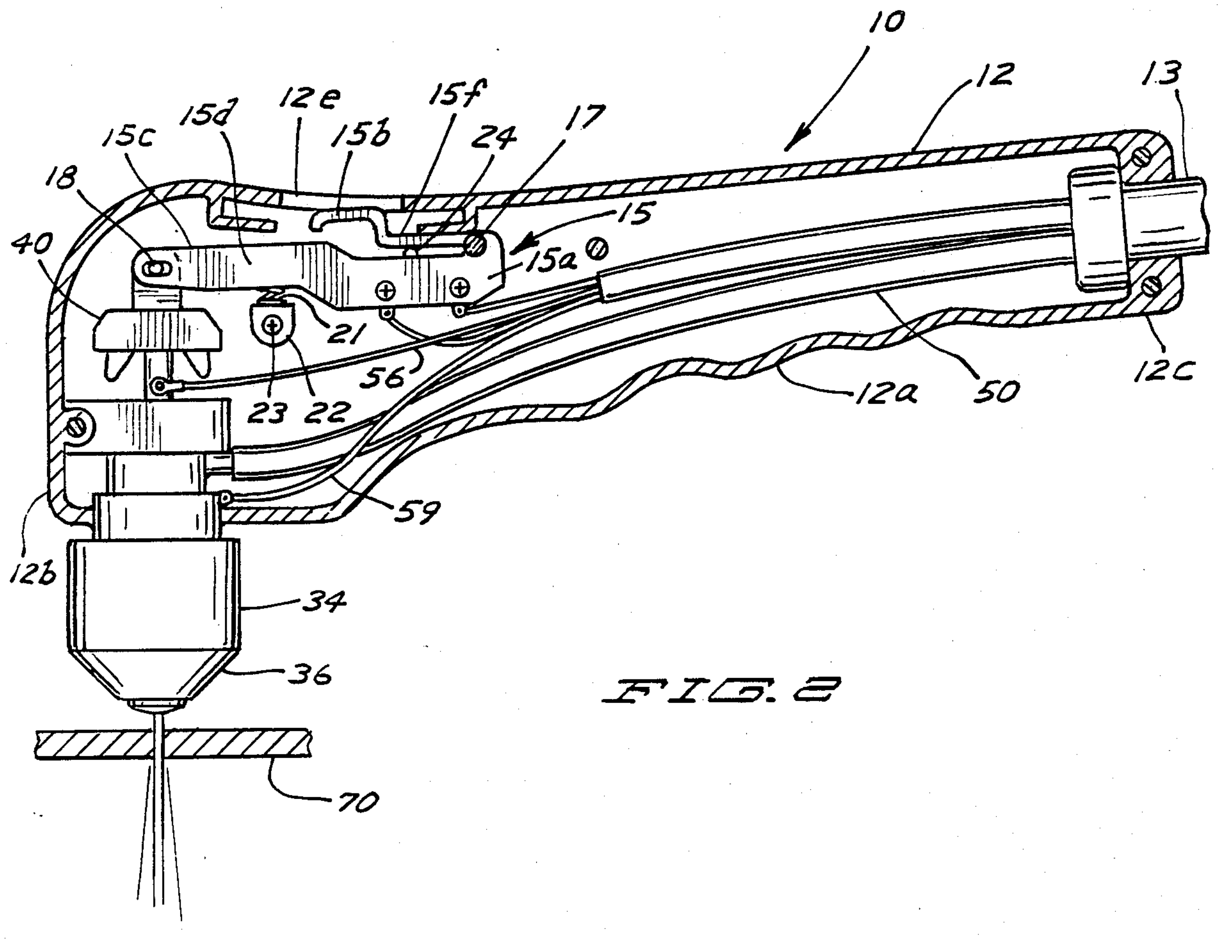
FIG. 2 is a view of the invention in a longitudinal section.

Shown in the drawings is a plasma torch 10 comprising a handle 12 with the near side thereof being removed, as shown in FIG. 2, said torch comprising a grip portion **12*a* and a forward end or head portion 12*b*** having much of the working parts of the torch disposed therein.

Received within the rear end portion **12*c* of said handle is a cable 13 which in a regular manner runs to it from an associated power supply now shown, the power supply of said plasma torch comprising a pressurized air supply and an adequate current source which are conventionally transmitted through said cable 13 to operate said torch. The pressurized air supply and its path are indicated by the arrows 14**.

Pivotally mounted within the upper portion of said handle is a switch 15 which is a push lever type of switch, said switch being horizontally elongated and being pivoted at its rear end portion **15*a* by a pivot 17** for vertical movement, said pivot being a pin which extends axially to a side wall of said handle to be suitably secured.

Extending forwardly and upwardly from said rear end portion of said switch integral therewith and extending forwardly thereof is an operating switch arm or lever **15*b* operable through a top opening 12*e* in said handle 12. Positioned under said switch lever arm 15*b* spaced rearwardly of the forward end thereof is a coiled compression spring 21 seated upon a support member 22 which is suitably secured to an adjacent side wall portion of said handle. Said spring extends upward into a recess 15*d* of said switch having its upper coil suitably secured therein about a projection 15*e*. The forward end portion of said switch is indicated at 15*c***.

Spaced rearwardly of said spring 21 and said support member 22 is a microswitch 24 suitably secured to an adjacent wall portion of said switch and extending upwardly to be engaged and operated by an adjacent portion 15*f* of said switch lever 15*b*.

Said switch lever is adapted to be depressed to two levels of operating positions as will be further described.

Pivotally depending from the forward end portion 15*c* of said switch 15 and secured by a pin or pivot 18 is a guide member 40. Said guide member has a central upstanding portion 40*a* forming a recess 40*c* therein and extending laterally from the bottom of said upstanding portion are arms 41 and 42 having downwardly and inwardly turned end portions form small recesses or notches A and D to be further alluded to.

Depending from the leading or forward end of said handle 12 is a relatively short brass contact tube 33 having threaded onto the outer end thereof a nozzle cap 34 which has about the sides thereof and secured thereto a cylindrical insulator 35.

Disposed within said nozzle cap 34 and extending outwardly thereof is a nozzle 36 having at its tip portion a restrictive orifice 36*a* and having an inner mating surface 36*c* for electrical connection with said nozzle as will be described.

Disposed within said contact tube and extending upwardly thereof are a pair of concentric cylinders or tubes 38 and 38*a* of which 38*a* is the inner and shorter one and therebetween is a passage 38*c*.

Within said tube 38*a* is a cylindrical plunger 37 having an electrode 43 suitably attached as by threading to its lower end portion as an extension thereof and the same is preferably formed of copper. Said plunger and said electrode extend substantially from a contact position with the surface 36*c* at the inner top of said nozzle to a point having its upper end 37*c* spaced from the top of said recess 40*c*. This will be further described. An annular passage 36*b* extends around the lower portion of said electrode as an extension of the passage 38*c*.

Inserted into the tip of said electrode is a small cylinder 43*a* of a material serving as a thermionic emitter such as the metallic element hafnium which when energized emits electrons to the ionizable gas passing thereby.

As a word of explanation, thermionic emission which is electron or ion emission, results from and increases rapidly with the increasing temperature of the emitter. The gas used here is pressurized air and is charged with current in passing by the emitter. The air has a certain resistance to current passing therethrough and the resistance generates heat.

The orifice in the nozzle constricts the ionized air carrying the current. All of the cutting current passes through an area with a small cross section resulting in high resistance and high heat.

In the heated state indicated the pressurized air turns into a plasma state and this extends only between the metallic insert 43*a* and the nozzle 36 in a non-transferred mode or between the metallic insert and the work piece 70, to be described, in a transferred mode.

Mounted upon said electrode 43 and bearing against the adjacent end of the cylinder 38*a* and retained by the nozzle 36 is a swirl tube 47 having angled grooves 47*a* therein which spins the plasma passing through the passage 36*b* and through said swirl tube.

Said tubes 38 and 38*a* have a non-conductive top cover 38*d* formed as a plate member having a close fitting opening 38*e* allowing the vertical movement of said plunger 37. With the nozzle cap 34 positioned and therein, the nozzle 36, the electrode 43, the swirl tube 47 and the plunger 37 are assembled in order.

With the plunger 37 in position engaging the nozzle 36, an annular groove or notch 37*b* is cut thereabout adjacent the top of said plate member 38*d* and providing a reduced diametrical portion 37*c* of said plunger, said portion having an upper shoulder 37*e* and a lower shoulder 37*f* which serve as upper and lower limit or stop members as will be described.

Engaged by said upper and lower shoulders 37*e* and 37*f* is a wafer plate-like member 38*g* suitably secured to the top surface of said member 38*d* and having an opening 38*h* therein to permit the vertical movement of the reduced diametrical portion 37*c* of said plunger 37.

The lower stop member permits a solid contact between said electrode and the adjacent surface 36*c* of said nozzle. The upper stop member provides an exact proper gap between the electrode and nozzle or between said cathode and said anode, as has been described.

Spaced downwardly from the top of said plunger is an annular groove or recess 37*a* thereabout. With the electrode 43 engaging the nozzle 36, said annular recess will be in a plane below the plane of the recesses A and D. Opposed points B and C are indicated in said recess.

Figure 3:
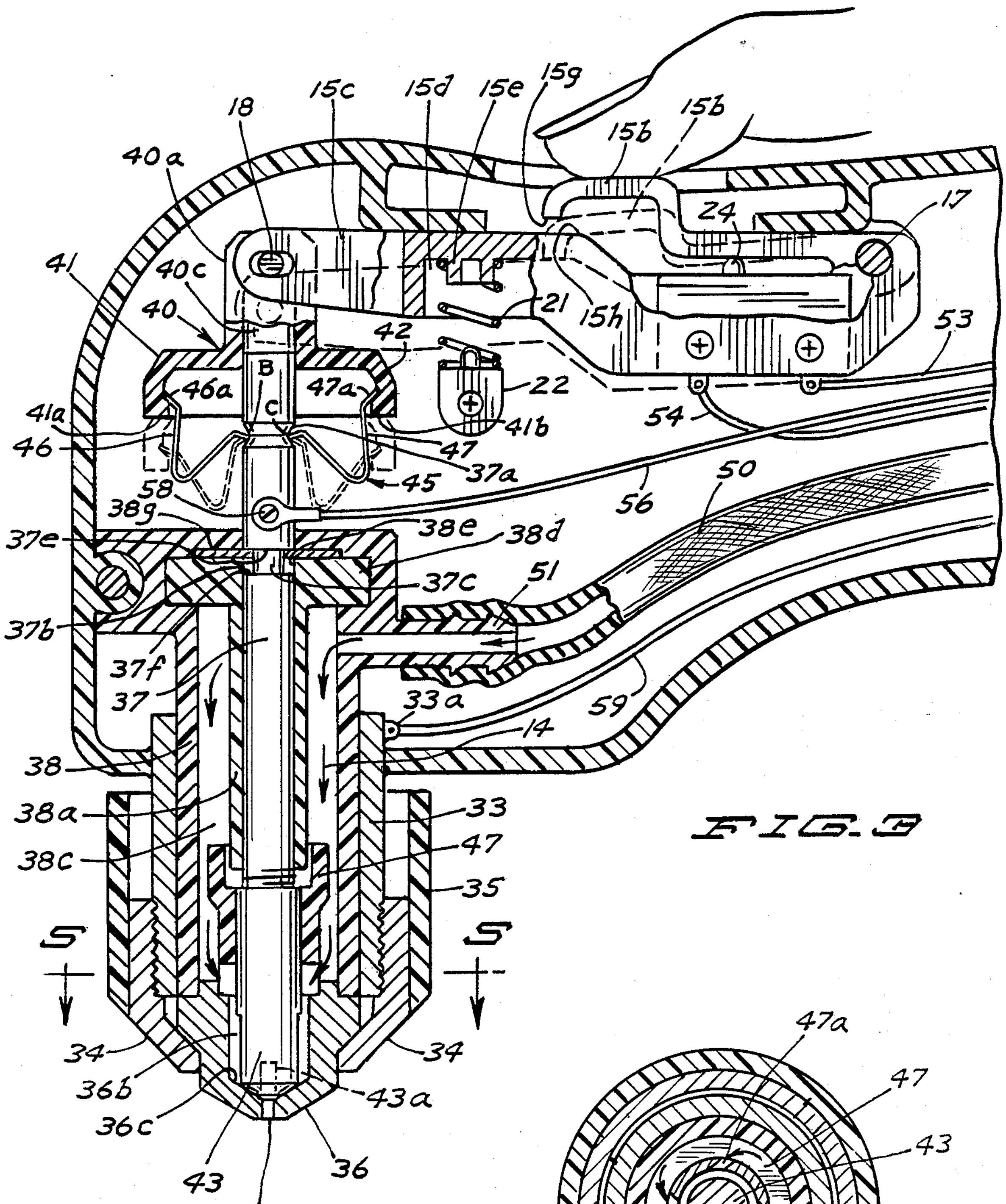
FIG. 3 is an enlarge view of the head portion of the invention in vertical longitudinal section.
Figure 5:
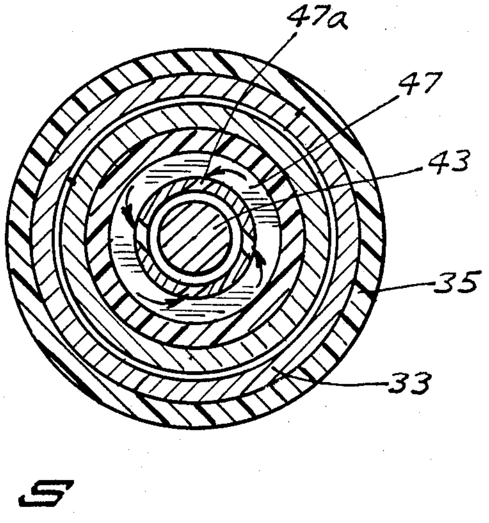
FIG. 5 is a view in horizontal section taken on line 5—5 of FIG. 3 as indicated.

Now, mounted upon said plunger 37 and said guide member 40 is an over-center spring mechanism 45. Referring to FIGS. 3 and 5, said spring mechanism is shown formed of a pair of leaf springs 46 and 47 configured as illustrated with said springs having their respective upper tip portions 46*a* and 47*a* engaging the notches A and D and their respective lower tip portions 46*b* and 47*b* engaging the opposed annular recess 37*a* points B and C at either side thereof. Said spring mechanism in its normal at rest position holds the plunger in its downward position with the electrode 43 engaging the nozzle 36.

Briefly described will be the mechanical effect of operating the circuitry. When the switch lever 15*b* is depressed, it deflects until the surface 15*g* comes into contact with surface 15*h*. As the switch lever 15*b* is further deflected, region 15*f* of the lever arm depresses the plunger on the microswitch 24 and closes its contacts 60*a* and 60*b* shown in FIG. 6. See also dotted line depressed position of 15*b* in FIG. 3.

Figure 4:
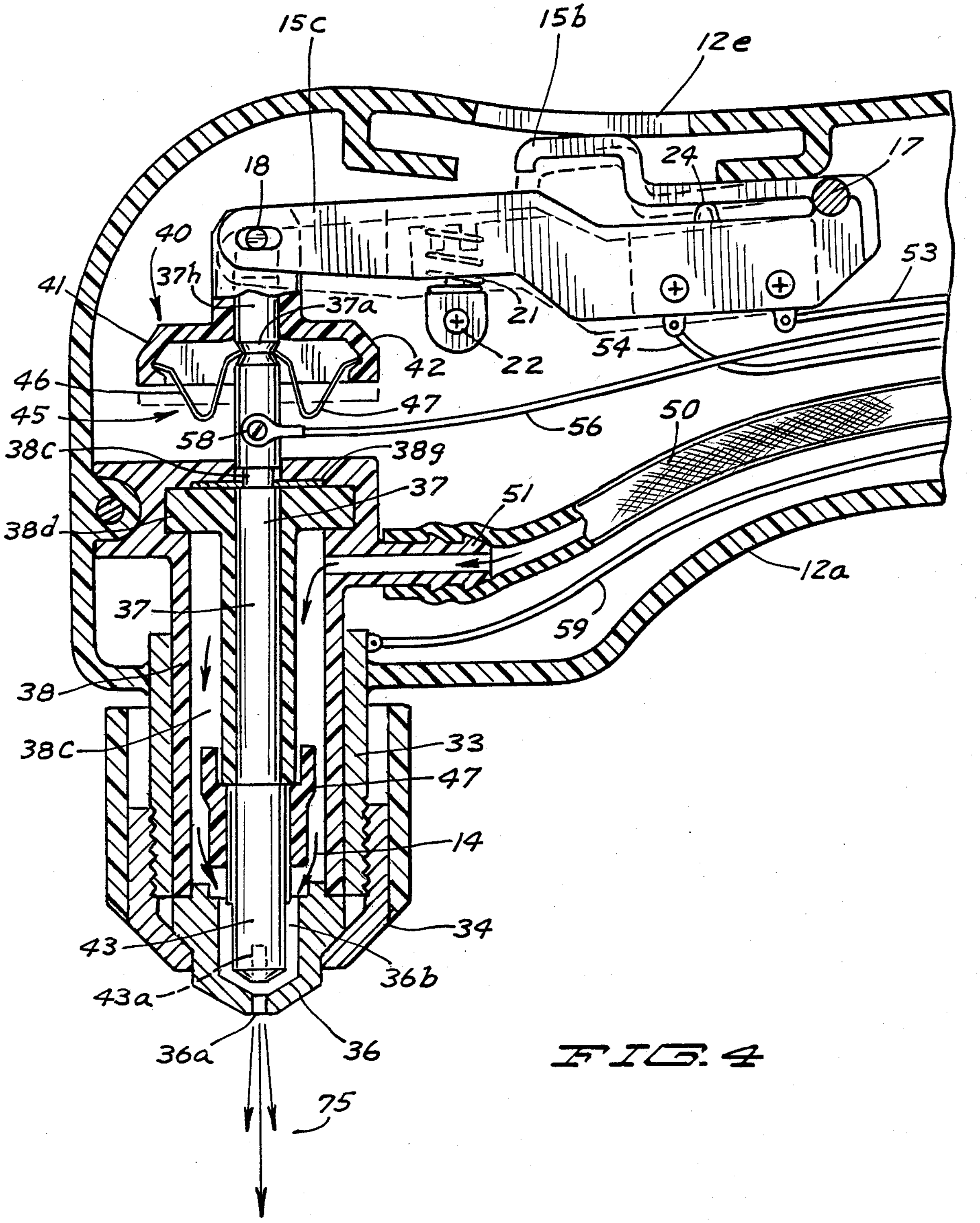
FIG. 4 is a view similar to that of FIG. 3 in another operating position.

As the switch 15*b* is depressed, the effect is to lower the forward end switch portion 15*c* pivoting it at 17 and which in being thus moved, moves the guide member 40 downwardly and this in turn moves the leaf spring end portions 46*a* and 47*a* downwardly to come into the plane of the spring ends 46*b* and 47*b*. Thus the respective ends of said springs 46 and 47 are brought into a common plane at a toggle point. When said switch lever 15*c* of said switch 15 is further moved into its further depressed position, the effect is to further lower the projected end 15*c* of said switch 15 and thus further lower the guide member 40 moving the spring ends 46*a* and 47*a* downwardly below the plane of the ends 46*b* and 47*b* which moves said ends below or beyond said toggle point. Immediately that said spring points 46*a* and 47*a* are below their toggle point with respect to said spring points 46*b* and 47*b*, the ends 46*b* and 47*b* snap upwardly causing upward movement of said plunger 37 and thus the consequent sudden withdrawal of said electrode 43 from its physical contact with the nozzle 36. See FIGS. 3 and 4. Thus as will be further described, in being energized and suddenly withdrawn from its physical engagement with said nozzle, an arc 40 is formed and this arc is essential to the following briefly described plasma cutting process. The rapid separation of said electrode and nozzle increases the useful life of said electrode and improves its otherwise performance.

The circuitry as such is not a part of the invention as claimed and is conventional for achieving the operation herein. The circuitry comprises two circuits, C1 and C2.

The cable 13 carries the wiring and the pressurized air gas supply which is conducted through a hose 50 secured to a nipple 51 which provides direct access to the annular passage 38*c*. From the annular passage 38*c*, the gas has direct passage to the annular passage 36*b* and through the angled slots 47*a* in the swirl tube 47 to the annular passage 36*d* about the electrode 43. From the annular passage 36*d* about the electrode 43. From the annular passage, the gas flows either through the orifice 36*a* or is allowed to escape back between the plunger 37 and the tube 38*a* and out of the opening 38*c*.

One wire 53 carried by said cable is connected to the micro-switch 24 and the return wire is 54.

A wire 56 referred to as a plasma arc wire is connected to the plunger 37 at the electrical connection 58. The ground wire 59 is connected to the contact tube 33 and contact 33*a* thereon.

Figure 6:
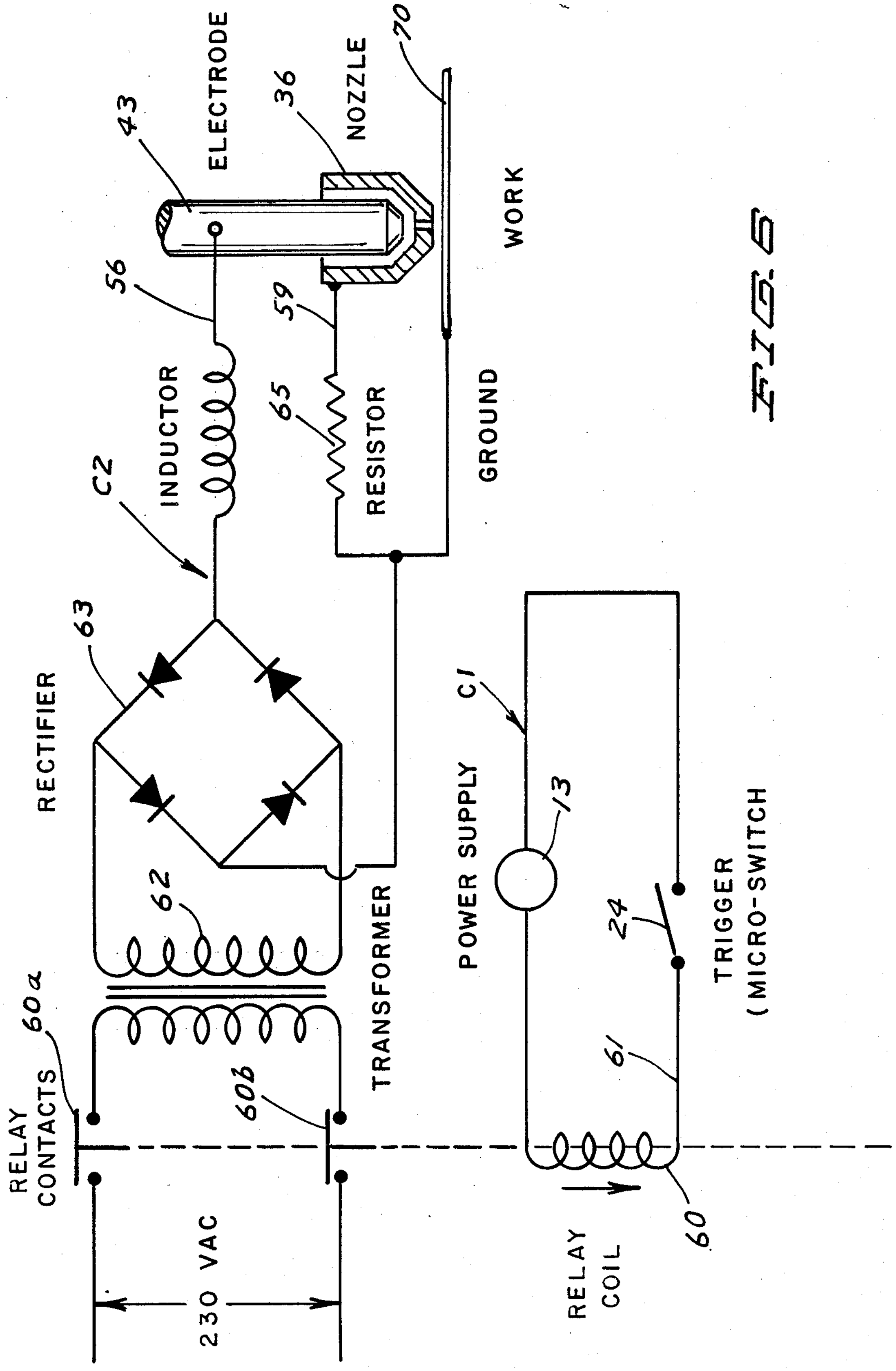
FIG. 6 is a partially schematic wiring diagram.

Referring to FIG. 6, a description of the operation of the circuitry is now given. To activate the apparatus, the micro-switch 24 is depressed and the initial depression of said micro-switch thus close the first circuit C1 whereupon the relay coil 60 is energized pulling in its contacts 60*a* and 60*b* to close what is a second circuit.

The depression of the micro-switch is continued as the second circuit C2 is energized. The electrode and nozzle are in electrical or touching engagement. The relay has closed its contacts 60*a* and 60*b* energizing the transformer 62 whose output is rectified by a rectifier 63 and current flows through a n inductor 64 and by line 56 through the electrode 43, the nozzle 36 and back through line 59 and resistor 65. The purpose of the inductor is to maintain a steady, smooth current flow. The resistor limits the arc starting current and also puts the grounded or work piece 70 at a somewhat lower potential than otherwise. The resistance is relatively small. A two ohm resistor, for example, has been found to be practical.

With said further depression of the micro-switch, the plunger guide 40 is moved downwardly to place the spring ends 46*a* and 47*a* below their toggle point with respect to the spring ends 46*b* and 47*b* and upon this occurrence, the spring ends 46*b* and 47*b* with the engagement of the plunger 37 therebetween, snaps said plunger upwardly into the recess of the guide 40*c*.

As said plunger and its attached electrode is withdrawn or pulled away from engagement with said nozzle 36, an arc is generated therebetween. The high temperature of the arc starts the thermionic emission of the insert 43*a*, resulting in a plasma jet or arc. With the gas passing through the swirl tube, the same having angled vertical slots therein to encourage the swirling action thereof, the plasma arc extends through the orifice 36*a* in said nozzle 36 as indicated in FIG. 6 at 75. With current flow taking a path of least resistance, the current flows through the work piece 70 and back through a ground clamp not shown, rather than through the arc starting path.

When the current is shut off from the torch, the over center spring mechanism is snapped back to its normal position pressing the electrode against the adjacent surface of the nozzle. Thus is completed the operation.

It will of course be understood that various changes may be made in form, details, arrangement and proportions of the product without departing from the scope of the invention which, generally stated, consists in a product capable of carrying out the objects above set forth, such as disclosed and defined in the appended claims in the parts and combination of parts disclosed and defined in the appended claims.

What is claimed is:

1. A metal cutting apparatus comprising a plasma arc cutting torch, having in combination, a torch housing, an electrically conductive nozzle carried by said housing, an orifice at an outlet end of said nozzle, an electrode in said torch engaging said nozzle, an electrical circuit including said electrode and nozzle, a spring assembly in connection with said electrode, said spring assembly normally urging said electrode into electrical contact with said nozzle, a switch, energizing said electrode and said nozzle, an operating engagement between said switch and said spring assembly, a lever operating said switch causing said spring assembly to be urged into an over center position, whereby said spring assembly is caused to separate said electrode from engagement with said nozzle upon said electrode becoming energized and causing an arc to be created therebetween.

2. The structure of claim 1, wherein said spring assembly causes rapid separation of said electrode and said nozzle.

3. The structure of claim 1, wherein said electrode serves as a cathode and said nozzle serves as an anode.

4. The structure of claim 1, wherein said spring being adapted to impact said electrode with said nozzle to cause the break-up of non-conductive oxide deposits.

5. The structure of claim 1, wherein said spring assembly being adapted to snap said electrode out of and into engagement with said nozzle.

6. The structure of claim 1, wherein said spring assembly comprises leaf spring members.

7. The structure of claim 1, wherein said electrode has upper limit and a lower limit stops, means engaging said upper and lower limit stops precisely limiting the corresponding movement of said electrode.

8. The structure of claim 1, wherein said spring assembly is caused by action of said lever to snap said electrode out of electrical engagement with nozzle thereby improving the otherwise performance of said electrode and increasing its useful life.

* * * * *